United States Patent [19]
Adam et al.

[11] Patent Number: 5,774,025
[45] Date of Patent: Jun. 30, 1998

[54] PLANAR PHASE SHIFTERS USING LOW COERCIVE FORCE AND FAST SWITCHING, MULTILAYERABLE FERRITE

[75] Inventors: John D. Adam, Murrysville, Pa.; Steven N. Stitzer, Ellicott City, Md.; Carol J. Painter, Library, Pa.; Michael R. Daniel, Monroeville, Pa.; Deborah P. Partlow, Export, Pa.; Andrew J. Piloto, Columbia, Md.

[73] Assignee: Northrop Grumman Corporation, Los Angeles, Calif.

[21] Appl. No.: 511,927

[22] Filed: Aug. 7, 1995

[51] Int. Cl.$^6$ .................................................. H01P 1/215
[52] U.S. Cl. ...................... 333/24.1; 333/1.1; 333/24.2; 333/31 R
[58] Field of Search .................................. 333/1.1, 24.1, 333/24.2, 31 R

[56] References Cited

U.S. PATENT DOCUMENTS

| | | | |
|---|---|---|---|
| H781 | 5/1990 | Stern et al. | 427/34 |
| 3,818,384 | 6/1974 | Schilz | 333/24.1 |
| 3,986,149 | 10/1976 | Harris . | |
| 4,445,098 | 4/1984 | Sharon et al. | 333/1.1 |
| 4,458,218 | 7/1984 | Babbitt et al. | 333/24.1 |
| 4,816,787 | 3/1989 | Stern et al. | 333/24.1 |
| 4,920,323 | 4/1990 | Schloemann et al. | 333/1.1 |
| 5,223,808 | 6/1993 | Lee et al. | 333/24.1 |
| 5,599,413 | 2/1997 | Nakao et al. | 156/89 |

OTHER PUBLICATIONS

"Electrical, Mechanical and Thermal Characterization of a Cofired, Multilayer Substraate Processed from Sol–Gel Silicia", by Lloyd Sanchez, Ceram Eng. Sci. Proc., 9[11–12] pp. 1590–1602 (1988).

"Thin Ferrite Devices for Microwave Integrated Circuits", by Gerard T. Roome and Hugh A. Hair, IEEE Transactions on Microwave Theroy and Techniques, Jul., 1968.

"Slot Line Application to Miniature Ferrite Devices", by Gerald H. Robinson and James L. Allen, IEEE Transactions on Miocrowave Theory and Techniques, Dec., 1969.

"Ferromagnetic Parts for Microwave Integrated Cricuits", by Gordon R. Harrison, Gerald H. Robinson, Bruce R. Savage and Donald R. Taft, IEEE Transactions on Microwave Theory and Techniques, vol. MTT–19, No. 7, Jul., 1971.

"A Slow Wave Digital Ferrite Strip Transmission Line Phase Shifter", by R.R. Jones, IEEE Transactions on Microwave Theory and Techniques, Dec. 1966.

"A Reciprocal TEM Latching Ferrite Phase Shifter", by J.W. Simon, W.K. Alverson and J.E. Pippin, IEEE, 1966.

"A Digital Latching Ferrite Strip Transmission Line Phase Shifter", by L.R. Whicker and R.R. Jones, IEEE Transactions on Microwave Theory and Techniques, Nov., 1965.

*Primary Examiner*—Archene Turner
*Attorney, Agent, or Firm*—Walter G. Sutcliff

[57] ABSTRACT

A planar phase shifter formed of multiple layers of a ferrite. Selected layers of the ferrite are patterned with a conductor and the multiple layers of magnetic dielectric and conductor are cofired. The phase shifter is fabricated by first obtaining ferrite powder. Then, layers of the ferrite are made, preferably by tape casting. Next the ferrite layers are metallized by applying selected amounts of conductive metals in a selected pattern upon the tape. Selected numbers of vias are placed through selected layers of tape and conductive metal is placed in the vias to provide vertical connections through the layers. The tape layers are then stacked in a predetermined order and are laminated. The laminated stack of layers is then fired to a temperature of approximately 800° C. to 1000° C., sintering the laminated layers into one integrated structure.

17 Claims, 3 Drawing Sheets

| FERRITE | DIFFERENTIAL PHASE SHIFT (deg/cm) | 50Ω LOSS (dB/cm) | 50Ω PHASE SHIFT (deg/dB) | 25Ω LOSS (dB/cm) | 25Ω PHASE SHIFT (deg/dB) |
|---|---|---|---|---|---|
| LITHIUM FERRITE $4\pi M_S=4800G$ $B_r=3360$ $\varepsilon_r=14.5$ $H_c=1.8\ Oe$ $FREQ_{min}=13.4GHz$ | @16GHz−139.7 @35GHz−58.9 | 0.25 0.40 | 559.0 147.0 | 0.12 0.20 | 1164 295 |
| MAGNESIUM FERRITE $4\pi M_S=3000G$ $B_r=2100$ $\varepsilon_r=12.9$ $H_c=0.85\ Oe$ $FREQ_{min}=8.4GHz$ | @8GHz−111.0 @10GHz−82.4 @12GHz−66.3 @16GHz−48.3 | 0.16 0.18 0.20 0.24 | 694 458 332 201 | 0.08 0.09 0.10 0.12 | 1388 916 663 403 | ized
PLANAR PHASE SHIFTERS USING LOW COERCIVE FORCE AND FAST SWITCHING, MULTILAYERABLE FERRITE

BACKGROUND OF THE INVENTION

1. Field of the Invention

This invention relates generally to high power phase shifters and more particularly to planar phase shifters using multilayerable ferrite.

2. Description of the Prior Art

Phase shifters are devices in which the phase of an electromagnetic wave of a given frequency propagating through a transmission line can be shifted. Such phase shifters have been utilized in radar applications such as electronic beam steering and phased array applications. Two main types of electronic phase shifters are currently employed for phased arrays: ferrite phase shifters and solid state semiconductor phase shifters. Construction of ferrite phase shifters falls into two general categories: phase shifters enclosed with a waveguide structure and phase shifters built using transmission line microstrip configurations. Ferrite phase shifters known in the industry use ferrimagnetic materials that include families of both ferrite and garnets which are basically ceramic materials with magnetic properties.

Toroid phase shifters are most commonly used because of their high phase shift per decibel (dB) of loss. Toroidal phase shifters are non-reciprocal phase shifters that use a toroid geometry consisting of a ferromagnetic toroid located within a section of waveguide. Toroid phase shifters, however, are difficult to fabricate at low cost because of the extruded and machined rectangular ferrite tubes used to provide a closed magnetic latching circuit and due to the tight dimensional tolerances involved.

Planar phase shifters do not require that toroids be machined. However, prior fabrication techniques have resulted in less than satisfactory results. One way known in the art to fabricate a planar phase shifter is to prefire ceramic components of the device, such as a monolithic block of ceramic as a substrate, and to then affix the metal components thereto, such as is described in U.S. Pat. No. 3,986,149 to Harris et al. The Harris et al. patent discloses bonding metal groundplanes to a ferrite block, masking the groundplanes and then depositing ferrite by arc plasma spraying between the groundplanes. The drawbacks associated with this technique include the inability to provide for 3-dimensional internal metal circuitry in the fabricated structure. The Harris et al. patent also requires high-temperature diffusion bonding to join the elements to the ceramic block, resulting in adverse effects on the grain structure of the ceramic and possible changes in chemical composition, i.e., magnetic performance. Furthermore, this approach makes it difficult to incorporate active semiconductor components such as silicon driver circuits (phase shifters require drivers).

Lloyd Sanchez, in an article entitled "Electrical, Mechanical and Thermal Characterization of a Cofired, Multilayer Substrate Processed from Sol-Gel Silicia", describes a process of making a substrate for integrated circuits. However, the invention of Sanchez is directed exclusively toward low dielectric constant packaging materials and, therefore, is inapplicable to phase shifter technology. The multilayer package referred to in Sanchez' article are passive materials which act as housings for active devices. In contrast, a phase shifter is an active device. Teachings of Sanchez are inapplicable to the construction of phase shifters because the processes used to make sol-gel silica cannot be used to produce ferrites and because silica cannot be used in phase shifter technology.

SUMMARY OF THE INVENTION

A planar phase shifter is provided which is formed of multiple layers of a ferrite, i.e., a magnetic dielectric. The preferred ferrite dielectric is a lithium ferrite. Selected layers of the ferrite are patterned with a conductor and the multiple layers of magnetic dielectric and conductor are cofired. The magnetic conductor is preferably gold, silver, copper or alloys thereof.

The planar phase shifter is fabricated by first obtaining ferrite powder. The ferrite powder is preferably obtained through sol-gel chemical precipitation in a water-based system in which the precipitated powder is filtered from the liquids. The precipitated ferrite powder is then placed in a drying oven prior to calcining the powder. Next, the powder is calcined or heated to a temperature of approximately 200° C. to 700° C.

The layers of the ferrite are preferably made by tape casting. Thus, the ferrite powder is mixed together with a binder, a plasticizer and a solvent to form a homogenized slip. A thin layer of the slip is placed upon a section of backing material, preferably Mylar. The ferrite slip is preferably provided upon the backing material through a squeegee process, although any means for providing a thin, even layer of slip upon the tape, such as extrusion, may be used. The slip is then dried and the backing material is removed leaving a flexible tape of ferrite.

Next the ferrite layers are metallized. The metallization is performed by applying selected amounts of conductive metals in a selected pattern upon the tape. The conductor pattern is applied to the layer of magnetic dielectric by any suitable method, and preferably thick film screen printing.

Selected numbers of vias or holes may also be placed through selected layers of tape. The vias may be openings through the device or conductive metal may be placed in the vias to provide vertical connections through the layers. In this way, metal may be formed three dimensionally within and around the ferrite. The metal may form the groundplane of the phase shifter, coils, slotline and stripline.

Besides tape casting, other means of forming the layers of magnetic dielectric which could be utilized include thin film techniques such as sputtering, PLD, SOL-GEL deposition, MOCVD, CVD, Jet Vapor Deposition and Plasma Arc Spraying.

The tape layers are then stacked in a predetermined order and are laminated. The lamination process involves pressing the layers together, usually under a controlled pressure, and usually with some added heat. In addition, selected layers of ferrite having conductive metal deposited thereon may be heated prior to the stacking and lamination steps to remove solvents in the metal. The laminated stack of layers is then fired to a temperature of approximately 800° C. to 1000° C., sintering the laminated layers into one integrated structure.

Any number of layers of tape may be utilized in the construction of the phase shifters. For the preferred embodiments of the phase shifters described herein it is preferred that approximately two to ten layers be used.

Other objects and advantages of the invention will become apparent from a description of certain present preferred embodiments thereof shown in the drawings.

DETAILED DESCRIPTION OF THE PREFERRED EMBODIMENTS

Figures 1, 2:
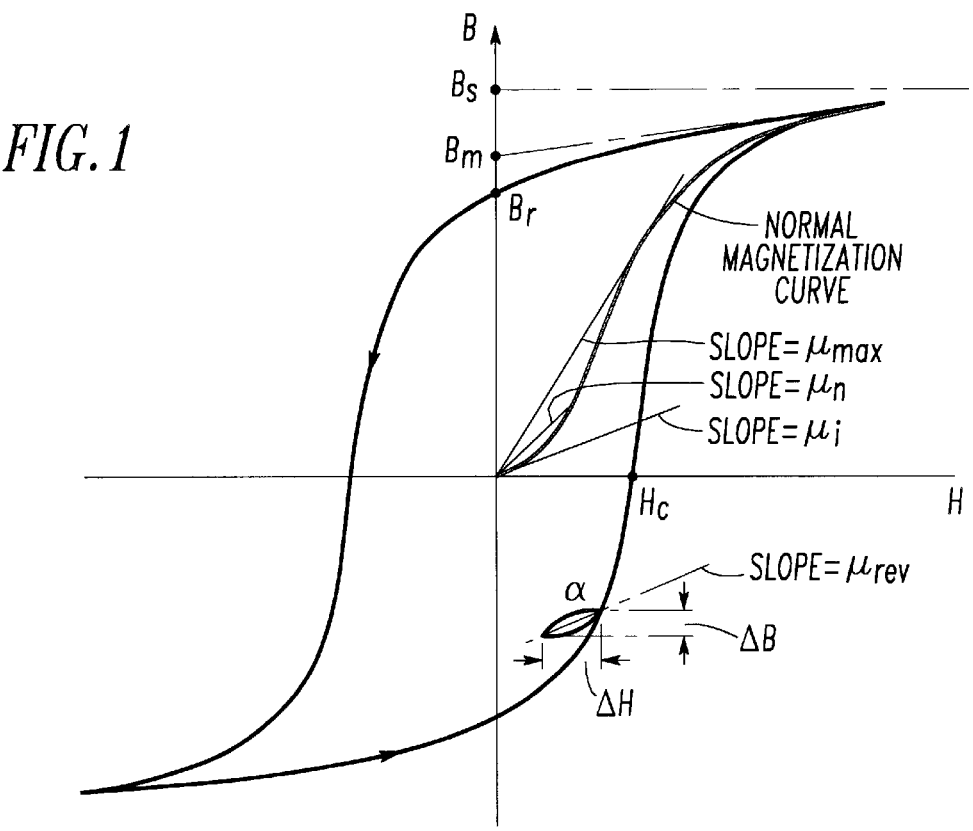
FIG. 1 is a graphical representation of applied field versus induction for magnetic materials.
FIG. 2 is a chart showing the magnetic properties of lithium ferrites and magnesium ferrites.

As shown in FIG. 1, antenna requirements dictate the switching parameters and therefore the material selection for the ferrite. FIG. 1 is a graphical representation of applied field versus induction showing the general characteristic behavior for magnetic materials. Lithium ferrites are preferred on the basis of their magnetic properties and low densification temperatures (i.e., less than 1000° C.). FIG. 2 summarizes the magnetic qualities of lithium ferrites and magnesium ferrites based upon electromagnetic modeling. The base line lithium ferrite to be used with the phase shifter is $Li_{0.3}Zn_{0.4}Mn_{0.05}Fe_{2.25}O_4$. This base ferrite has a $4\pi M_s$ of approximately 3870 to 4524 Gauss. However, a number of dopants may be used to "fine tune" or adjust the characteristics of the ferrite. Some possible modified lithium ferrites include the following:

$Li_{0.3-c/2}Zn_{0.4}Mn_{0.05}Fe_{2.25}Co_cO_4$ $Li_{0.3-n/2}Zn_{0.4}Mn_{0.05}Fe_{2.25}Ni_nO_4$ $Li_{0.3}Zn_{0.4}Mn_{0.05}Fe_{2.25-r}RE_rO_4$ $Li_{0.3+t/2}Zn_{0.4}Mn_{0.05}Fe_{2.25-3t/2}Zr_tO_4$ $Li_{0.3-u/2}Zn_{0.4}Mn_{0.05}Fe_{2.25-u/2}Cu_uO_4$ $Li_{0.3+s/2}Zn_{0.4}Mn_{0.05}Fe_{2.25-3t/2}Sn_sO_4$ $Li_{0.3}Zn_{0.4}Mn_{0.05}Fe_{2.25-i}In_iO_4$

As described more fully below, tape casting will be the preferred phase shifter fabrication technique for X— and $K_u$— bands and a thin film deposition technique may be more appropriate at $K_a$ band and higher frequencies.

The phase shifters are fabricated according to the following steps.

Precipitation of Ferrites

Ferrites used in the present invention are precipitated in a water-based system. Chemical precipitation is a subset within the sol gel chemistry and for many years, it has been known that people can precipitate chemicals from water-based systems. But before now, that technology has not been utilized to make ferrites for phase shifters. The precipitated ferrite is basically a powdery sludge that has sunk to the bottom of a mixture of water, acid and other clear liquids.

The precipitation process results in a very high purity and uniform grain size as opposed to other techniques in the prior art. A nonuniform grain size will negatively effect the efficiency of the electronic device and will broaden the distribution of the dielectric and magnetic characteristics of the device, causing wider tolerances on the properties that are critical to the phase shifter function. This process also results in a fine powder, which is desirable for good grain size control in the final fired ferrite. Fine particles are generally desired because the particles can always be grown past the domain size during heat treatment.

There is, however, a limit to how small the grains should be in the final fired ferrite. The smaller the grain size the lesser the switching time and generally speaking the smaller the grain size the lower the required drive field until the grain size is below about four microns, at which the required drive field increases. The increase in the required drive field occurs when the size of the grain decreases to the point that the size of the grain is approximately the size of the domain. Thus, the preferred grain size is approximately between 1 micron and 20 microns, with a grain size of around 4 microns being preferred.

The reason for the increase in the drive field when the grain size equals domain size is as follows. When a grain has a number of domains in it, which are magnetically aligned in opposite directions, and a magnetic field is applied, the field propagates through all the domain walls until they are erased, i.e., all domains are oriented in the same direction, yielding a single domain. This process is called domain wall movement. However, the grain boundary, i.e., the place where grains border one another, provides opposition or resistance to the domain wall movement through the ceramic. Thus, if the ceramic grains are sufficiently small, much of the ceramic material in the grain is serving as the grain boundary and there is relatively little ceramic material that is not disrupted by being proximate to the grain boundary. As the field attempts to propagate across the ceramic, the movement of the field is hindered by a grain boundary before it can propagate a substantial amount, thus requiring a higher drive field. Therefore, it is preferred to utilize ferrite grains that are small but not so small as to be the size of a single domain.

The performance of devices formed by multiple layers of ferrites depends upon the control of grain size and grain uniformity that is not obtained with conventional ceramics. Conventional ceramics are made by heating the powders and then grinding down the lumps that form during heating and repeating the process a number of times in an attempt to reach chemical homogenization. Thus, iron oxide and nickel oxide powders are put in a vessel and ground and mixed and then heated at a very high temperature until they fuse and react with one another. When that happens big solid chunks are formed which would then have to be reground. Every time the powders are heated the grains grow. The milling process does not result in a fine powder nor in a uniform grain size. With traditional ceramics the grains are already overgrown so performance as good as that obtained with fine grain materials is not achieved, regardless of the amount of milling.

Every time ceramic particles are heated, the ratio of one element to another elements changes. In the preferred sol gel precipitation method, the particles are very fine to begin with and are not ground and heated and cooled repeatedly, and therefore do not incur changes in the ratio of elements. Further, by not having to grind big chunks of hard material, contamination associated with grinding is avoided.

One or more dopants may be added to the ferrite to tailor the ferrite for the particular device characteristics sought. For example, the additional of zinc allows the magnetization of the ferrite to be tailored in that zinc provides the ferrite with a higher value of $4\pi M_s$. $4\pi M_s$ is the saturation magnetization. A high $4\pi M_s$ means that the ferrite will be more highly magnetic when fully magnetized and has a beneficial effect on coercive force, magnetic loss and densification. The addition of Mn results in a decrease in the dielectric loss as well as improving remanence and reducing the stress sensitivity of remanence. The addition of Co can change the sign of the anisotropy constant of the material and also provides a range of spin wave line widths. The inclusion of nickel improves loop squareness, i.e., greater loop squareness means that the saturation magnetization is reached by applying a minimum magnetic field, and increases remanence. Ti, when added to the ferrite, improves densification at low firing temperatures and enhances grain growth. The addition of Ti allows the magnetization of the ferrite to be tailored, as the addition of Ti decreases the value of $4\pi M_s$.

Separation of Ferrite Precipitate

The solid precipitate must then be separated from the liquid. This is preferably done by mechanical filtering. The powder is still wet when filtered from the liquid. Therefore, the powder is next placed in a drying oven to evaporate the remaining liquid.

Calcining the Ferrite Powder

The dried powder is very fine and soft. However, it still has some of the residual chemicals present. For example, if its an oxalate it has some carbon and some hydrogen from the oxalate radical which must be removed. To do this, the powder is heated to a moderately high temperature between approximately 200° C. and 700° C. in a process that is called calcining. Care should be taken during this step to avoid heating the powder to where it begins to stick together. The volatile components that might have remained from precipitation, such as hydrocarbons left over from the oxalate radical or residual acid that did not evaporate in the drying step are removed, leaving calcined powder.

Preparing the Ferrite Slip

Then the slip or slurry is mixed for tape casting. The calcined powder, the binder, the plasticizer and a solvent are placed in a container that has grinding balls or some other grinding media. The grinding media performs two functions. First, if soft lumps have formed in the powder, the grinding media will break apart those lumps. Second, the grinding media will also mix the ingredients so that they are homogenized. Then, the ingredients are placed on a mill and milled for a given period of time so that the slip is homogenized and has a smooth, creamy consistency.

Tape Casting

A section of mylar or some other backing material is positioned. Then, the ferrite slip is cast upon the mylar backing into a thin sheet by a squeegee process, i.e., slip is provided upon the backing, the backing is moved relative to the squeegee (or the squeegee is moved relative to the backing) and the slip is thus spread in an even coat over the backing. The resulting tape is wet and is then heated or air dried, leaving a finished tape.

Processing of the Layers

The tape is then cut into squares and the mylar is stripped off the ferrite tape. That tape might receive a screen-printed pattern of metal circuitry, or a screen-printed large square of metal which would be a ground plane, or a series of ground planes hooked together with metal connectors. The ferrite tape might have one or more holes punched through it forming vias and each via would have a conductive metal, such as gold, introduced into the via providing a vertical connection between one layer and a layer above or below that layer. In this way, three dimensional patterns of metal can be formed. The metal patterns may form coils, groundplane, stripline or slotline.

The metal is preferably applied as a powder that is in a paste having a solvent and binders. The metal is then applied to the tape through screen printing. Next, the metallized piece of unfired tape is placed on a tray and heated in an oven to approximately 70° C. which drives off the solvent that was in the metal. The metal used in the metallization is not a solid in these pastes, but rather is flakes or spheres. A uniform spherical powder is preferred because it provides a dense line even before it is fired, and when it fires the pores are eliminated, providing a very good adhesion to the ceramic and a dense, pore-free layer that will have high conductivity. Pores in the metal result in the metal not being as conductive and will cause power losses in the circuit given off as heat.

Lamination of the Layers

Each metallized layer is then stacked in a prescribed order and is put through a process called lamination. The lamination process involves pressing the layers together, usually under a controlled pressure. Usually the lamination process is conducted with some added heat because the binder in the ceramic tape becomes somewhat tacky when heated so that the layers stick together better. After the lamination process, the flexibility of the metallized stack of layers is lost, leaving a more rigid part.

Cofiring the Layers

Then, the stack is fired in an oven under a controlled temperature, heating rate and atmosphere. Cofiring the individual layers allows the laminated structure to sinter into one integrated structure. If the stack is heated too quickly, the binder could start to evolve rapidly as gases, like carbon dioxide or carbon monoxide, which could cause the delamination of the layers. For this reason, the laminate is heated slowly to 500° C. to burn off the binder.

Lower-temperature firing microwave ferrites synthesized by SOL-GEL technology in combination with tape casting technology permit the use of high-conductivity metal thick film pastes that can be cofired with ceramics. These metals include gold, silver and copper. Cofiring temperatures of approximately 800° C. to 1000° C. are used in these lower-firing systems, called LTCC (Low Temperature Cofired Ceramics).

The LTCC ceramic circuit technology offers significant benefits in terms of design flexibility, density, reliability and high circuit density integration, i.e., integration of microwave/millimeter wave transmission media and DC bias windings. High temperature and low temperature cofired ceramic tape offers low loss electrical performance for a broad range of frequency applications from DC to W-Band. The multilayering capability of this material allows for composite electrical parameters to be handled within a single substrate/housing, thus solving and simplifying many producibility problems and integration requirements. The tolerance that can be held is about 0.2% which allows repeatability for the design of a planar phase shifter up to millimeter wave frequencies.

The low temperature ceramic tape system is compatible with standard thick film equipment and processing. The major difference occurs in the materials used. The glass dielectric paste is replaced with an unfired "plasticized" sheet of dielectric tape. The metallization patterns are printed on each sheet of tape separately and laminated into a final structure.

Furthermore, due to its porosity, the ferrite tape acts to trap the printed conductor before the lamination operation. The result is less "spreading" of the conductor; therefore, higher line definition can be achieved using unfired tape than conventional thick film dielectric. Four (4) mil lines and three (3) mil spaces between lines on as many as seventy-five (75) layers are easily achieved through this process. Vias in the tape are either laser drilled at speeds up to 50 vias per second or mechanically punched at speeds approaching 8 vias per second prior to the firing process. Unlike the conventional thick film technology, either of these approaches lends itself to extremely high production volume and yields.

Since each layer is printed on the unfired sheet separately, the wavy surface characteristic of conventional thick film dielectrics never develops in the multilayer tape approach. The lamination process provides for a flat, smooth structure.

Furthermore, the reduced number of firings and the lack of a composite structure, i.e., no prefired refractory ceramic base as in the case of copper thick film, virtually eliminates the possibility for bowing. For the purposes of constructing a planar phase shifter, multiple layers are used to integrate both the microwave transmission media and the DC windings. Traditional single layer structures on materials like alumina, GaAs, or silicon limit the number of elements that can be produced because of the lack of area to manipulate the proper line lengths that must be maintained between elements. In contrast, the disclosed multilayer designs facilitate the use of numerous elements within a given structure, i.e., integrated DC windings, microwave/millimeter transmission media, and physical structure. In addition, lines can be isolated from each other by using a separate layer with ground planes located between active layers.

The low temperature firing characteristics (i.e., less than or equal to 1000° C.) of the ceramic tape allow the use of the preferred metallization, gold, within the structure. The use of other metals is also possible. In addition, gold, silver or copper-filled vias have high electrical conductivity, allowing them to serve as an electrical connection between layers. The ceramic tape layers can be cast to yield a preselected dielectric thickness. This allows controlled impedances of the microstrip and/or stripline transmission lines, which provides lower insertion loss and decreased crosstalk compared to conventional waveguide devices.

The substrate may selectively be cavitied or recessed, creating a total package rather than just a stand-alone device. Strategically placed vias within the walls of the package provide for isolation or the transition between microstrip and stripline. When the multilayer structure is used as a substrate, vias may be used as an interconnect between shadowing ground planes, thus forming a stripline configuration.

Overall multilayering capability of the ferrite material allows for composite electrical requirements to be handled within a single substrate, thus solving many producibility and integration requirements for a low cost planar phase shifter.

An alternative to tape casting involves extrusion, in which a very thin ribbon of material is extruded out of a slotted device. Then mylar is positioned underneath the slotted device and carries it along, allowing it to dry and providing a support for the material while it is drying. As a further alternative to ferrite precipitation and tape casting, Pulsed Laser Deposition ("PLD") could be used. PLD is a thin film technique that would be used instead of tape casting if the wave that is to be phase shifted has a very short wavelength requiring very thin layers for the phase shifter. In this case, tape is not desirable because tape can only be made so thin until the tape thickness is the size of the ceramic particles that are in it. There are some wavelengths for which a tape cannot be cast thin enough, i.e., those applications where very short wavelengths are being shifted, and a thin film technique is preferable to tape casting to make the ferrite layers. PLD is one of the thin film techniques that can be used. It involves taking a source of ferrite such as a block of ferrite or precipitated ferrite powder and a laser is directed at it, causing ceramic to be deposited on a carrier that is placed nearby. That carrier becomes coated with vapor deposited ferrite. Then, a metal could be placed atop the ceramic by sputtering and another layer of ceramic could be deposited, and the steps repeated as necessary. Other techniques such as Jet Vapor Deposition, SOL-GEL and MOCVD promise significantly higher deposition rates.

Three preferred planar phase shifter device structures are described herein which cover three cases of microwave magnetic field orientation relative to the DC field in the ferrite. These geometries will also function in a latched or digital phase shifter mode, since a closed ferrite circuit and magnetic field pulse conductors are provided by these structural configurations. It is distinctly understood, however, that other phase shifter device structures may be fabricated according to the teachings of the present invention.

Figure 3:
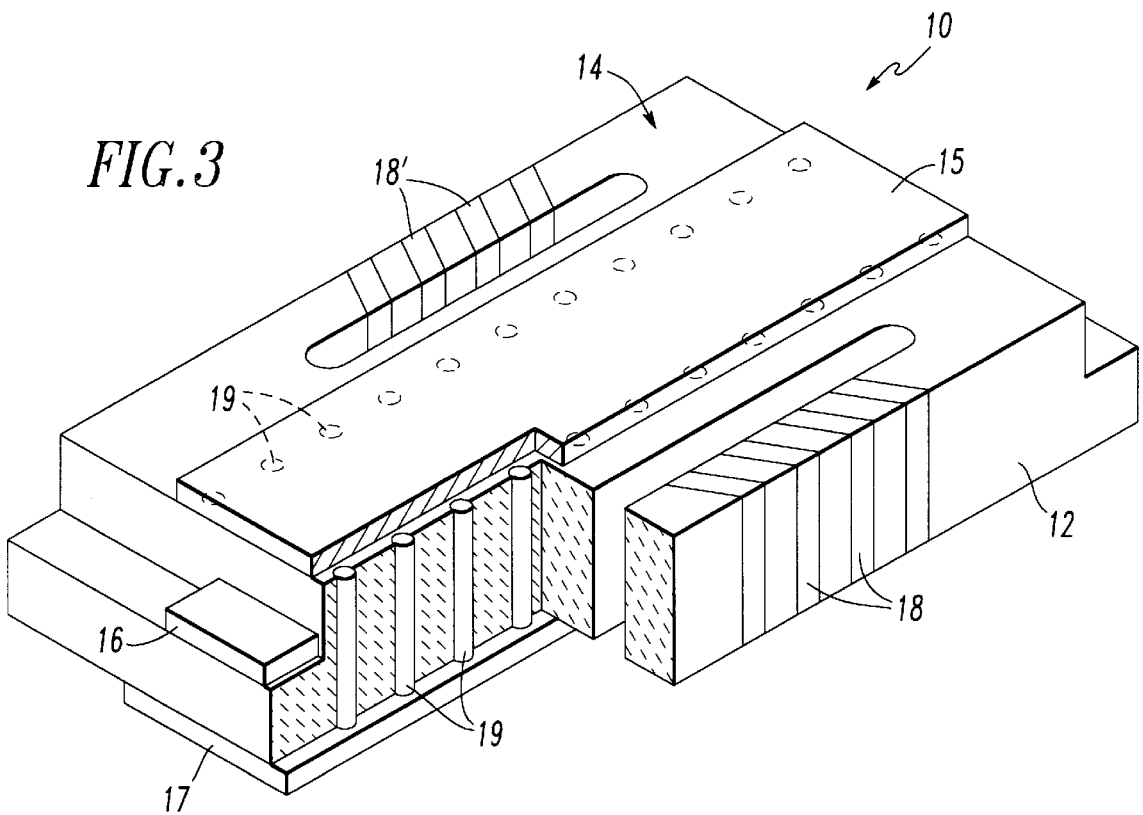
FIG. 3 is a perspective view of a first preferred planar phase shifter made according to the teachings of the present invention.

The stripline phase shifter 10 shown in FIG. 3 comprises a ferrite-filled stripline with two side branches containing the pulse conductors 12. The stripline conductor 16 runs the entire length of the phase shifter as does the microwave ground conductor 14. The two side branches on either side of the microwave stripline 16 and ground conductor 14 contain two continuous DC bias windings 18, 18'. The number of turns of the windings 18, 18' will vary based upon the design requirements of the phase shifter. The ground conductor 14 has an upper portion 15, a lower portion 17 and vertical posts 19 which connect the upper and lower portion 15, 17. The vertical posts 19 are preferably spaced apart a distance of one tenth or less of the wavelength of the RF signal with which the phase shifter is used. With the groundplane upper portion 15, lower portion 17 and side posts 19, the groundplane 14 resembles a square tube or a square coax. The stripline conductor runs through the center of the groundplane positions. Here the DC field in the central region is parallel to the stripline and perpendicular to the microwave magnetic fields around the stripline. This structure utilizes the interaction between a linearly polarized microwave magnetic field and the ferrite and results in a reciprocal phase shifter.

As mentioned more fully above with respect to the fabrication of phase shifter devices, the phase shifter shown in FIG. 3 (as well as the phase shifter shown in FIGS. 4 and 5, described below) has metal parts running therethrough. In the embodiment of FIG. 3, slots 21 are provided through the ferrite on both sides of the groundplane 14. Vias filled with metal form the side posts 19 of the groundplane 14 and the coils 18, 18'. The ferrite tape is punched so that slots, holes or vias may be provided therethrough. The openings through the ferrite tape may be made by any convenient means. Creating the holes, slots and vias in the unfired prelaminated ferrite layers may be easily and inexpensively done upon the unfired ferrite layers. No expensive machining of fired ceramic parts is necessary.

Figure 4:
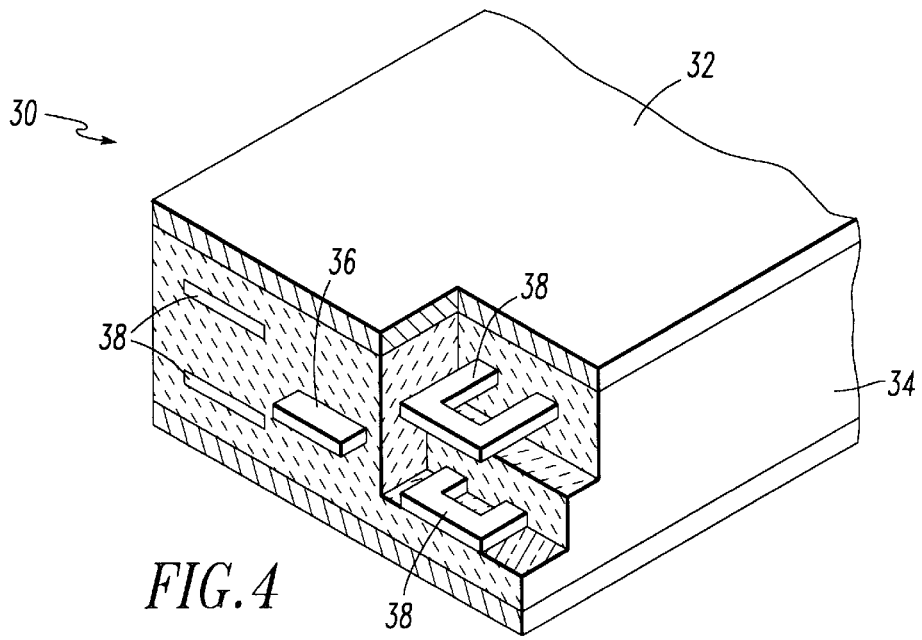
FIG. 4 is a second preferred planar phase shifter made according to the teachings of the present invention.

A second preferred phase shifter configuration utilizing stripline is shown in FIG. 4. This device also has a stripline conductor 36 running the entire length of the phase shifter and has microwave ground 32 also running the entire length of the phase shifter. The side branches 34 contain DC bias windings 38. This configuration contains a more complex magnetic latching circuit arrangement than that shown in the device of FIG. 3 and is necessary to provide an internal DC magnetic field that is transverse to the microwave magnetic fields and normal to the stripline. This structure also utilizes the interaction between a linearly polarized microwave magnetic field and the ferrite and results in a reciprocal phase shifter.

Figure 5:
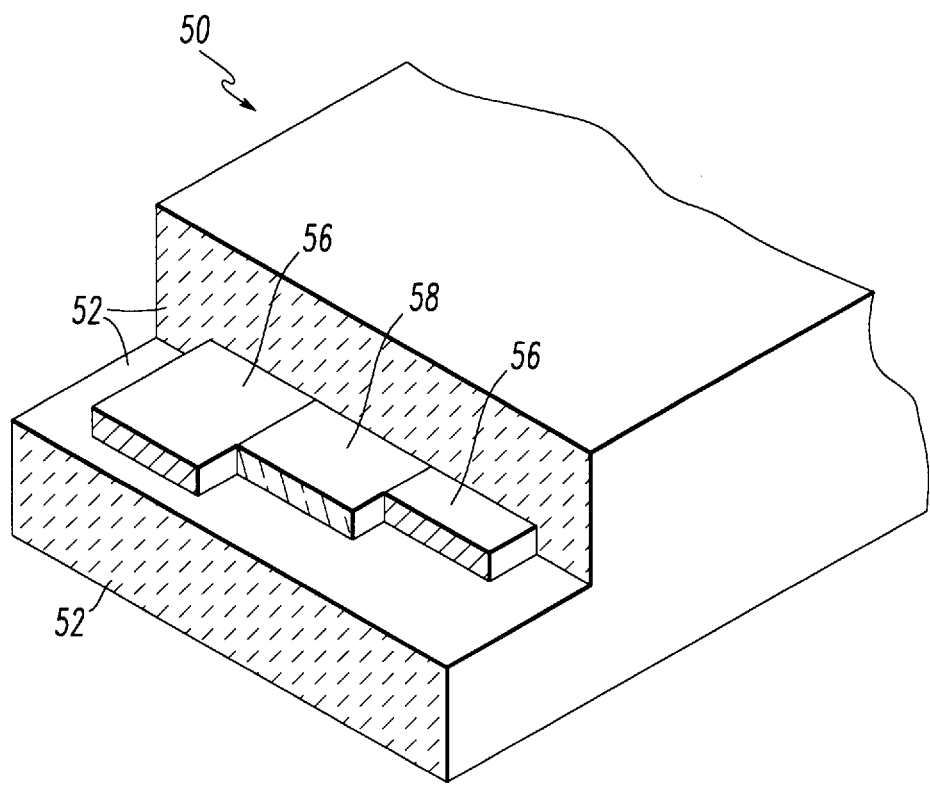
FIG. 5 is a third preferred planar phase shifter made according to the teachings of the present invention.

A third preferred phase shifter configuration is shown in FIG. 5. This configuration relies on the interaction between the elliptically polarized microwave fields from the slot line 56 which runs the entire length of the phase shifter and can thus provide non-reciprocal phase shift. The arrangement shown, however, is a reciprocal phase shifter which uses the slotline or balanced line 56 to the magnetic field current pulse and thus achieves some simplification in fabrication. A dielectric material 58 is provided between the slotline. Dielectric material 58 preferably has different magnetic and dielectric properties than the surrounding ferrite. A non-reciprocal implementation would require magnetic DC fields which were in the same direction in both the upper and lower ferrite layers, necessitating a third ferrite layer to provide the field closure path. The interaction between a circularly polarized wave and the ferrite provides significantly more differential phase shift than the linearly polarized case, thus the non-reciprocal phase shifter provides a more compact, lower loss device.

While certain present preferred embodiments have been shown and described, it is distinctly understood that the invention is not limited thereto but may be otherwise embodied within the scope of the following claims.

We claim:

1. A planar phase shifter comprised of multiple layers of a glass-free magnetic dielectric wherein selected layers of said magnetic dielectric collectively have a phase shifter conductor pattern provided thereon, said magnetic dielectric being sinterable at a temperature below the melting temperature of said conductor and wherein the multiple layers of magnetic dielectric and conductor are cofired.

2. The phase shifter of claim 1 wherein the magnetic dielectric is a ferrite.

3. The phase shifter of claim 2 wherein the ferrite dielectric is a lithium ferrite.

4. The phase shifter of claim 1 wherein the conductor is at least one material selected from a group consisting of gold, silver, copper and alloys thereof.

5. The planar phase shifter of claim 1 wherein the layers of magnetic dielectric are made by tape casting.

6. The phase shifter of claim 5 wherein the tape is fabricated of a magnetic dielectric powder, organic binders and plasticizers.

7. The phase shifter of claim 6 wherein the magnetic dielectric powder is a ferrite.

8. The phase shifter of claim 6 wherein the magnetic dielectric powder is a lithium ferrite.

9. The phase shifter of claim 8 wherein the lithium ferrite is $Li_{0.3}Zn_{0.4}Mn_{0.05}Fe_{2.25}O_4$.

10. The phase shifter of claim 8 further comprising at least one dopant added to the lithium ferrite, wherein the at least one dopant is selected from the group consisting of Co, Ni, a rare earth element, Zn, Cu, Sn and In.

11. The phase shifter of claim 5 wherein the magnetic dielectric powder is a ferrite powder that is made by a chemical precipitation.

12. The phase shifter of claim 5 further comprising at least one conductor ground plane placed in contact with the tape cast layers.

13. The phase shifter of claim 1 wherein the conductor pattern is applied to the layer of magnetic dielectric by thick film screen printing.

14. The phase shifter of claim 1 wherein at least one of the layers of magnetic dielectric is fabricated using a thin film technique selected from the group consisting of sputtering, PLD, SOL-GEL deposition, MOCVD, CVD, Jet Vapor Deposition and Plasma Arc Spraying.

15. The phase shifter of claim 1 wherein the conductor pattern is applied to the layer of magnetic dielectric by a thin film metallization technique selected from the group consisting of evaporation and sputtering.

16. A planar phase shifter comprising:
    multiple cofireable glass-free ferrite layers;
    said glass-free ferrite layers including a phase shifter conductor pattern thereon.

17. A planar phase shifter fabricated according to the following steps:
    (a) arranging a number of glass-free ferrite tape layers, selected ones of said layers having a portion of a phase shifter pattern thereon, into a stack in a desired order;
    (b) laminating the layers; and
    (c) firing the stack of layers to a temperature of approximately 800° C. to 1000° C., sintering the layers into one integrated structure.

* * * * *